C. H. EMERSON.
SCREW CONVEYER.
APPLICATION FILED SEPT. 4, 1918.
1,320,214.
Patented Oct. 28, 1919.
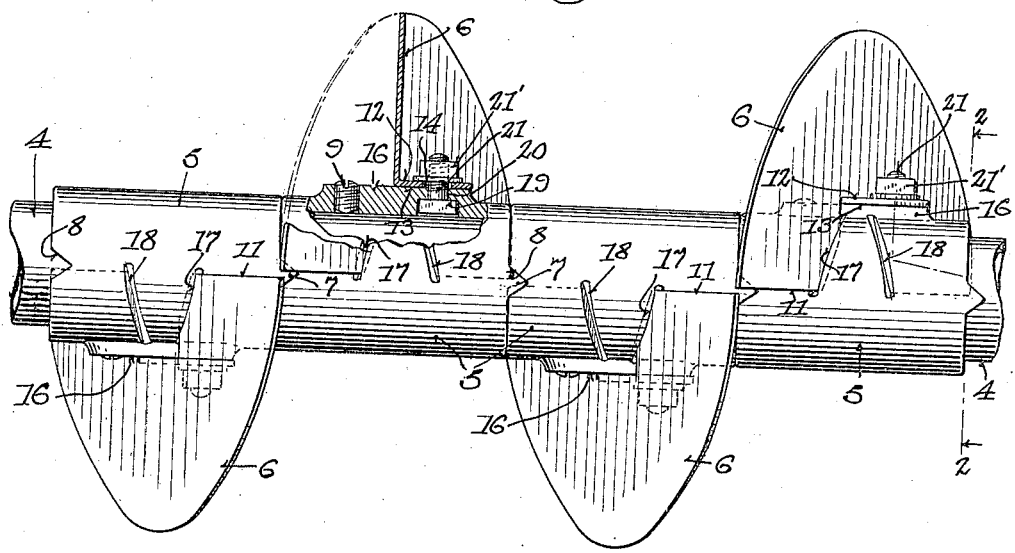
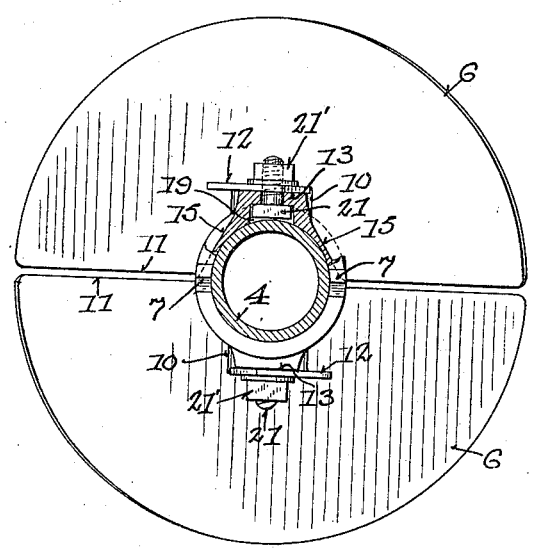
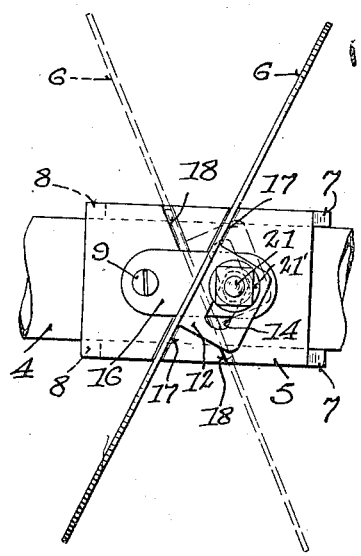
Inventor
Charles H. Emerson
By Morsell, Keeney & French
Attorneys.

UNITED STATES PATENT OFFICE.

CHARLES H. EMERSON, OF MILWAUKEE, WISCONSIN.

SCREW CONVEYER.

1,320,214.      Specification of Letters Patent.     Patented Oct. 28, 1919.

Application filed September 4, 1918. Serial No. 252,532.

*To all whom it may concern:*

Be it known that I, CHARLES H. EMERSON, a citizen of the United States, and resident of Milwaukee, in the county of Milwaukee and State of Wisconsin, have invented new and useful Improvements in Screw Conveyers, of which the following is a description, reference being had to the accompanying drawings, which are a part of this specification.

The invention relates to screw conveyers, the general object being to provide a conveyer of this type in which the flights of the conveyer can be easily reversed as is fully described and explained in the specification and shown in the accompanying drawings in which:

Figure 1 is a side view of a section of the conveyer, parts being broken away and parts being shown in section; Fig. 2 is a section taken on the line 2—2 of Fig. 1, parts being broken away; Fig. 3 is a detail plan view of one of the parts forming the conveyer.

In the drawings: the numeral 4 designates the drive shaft to which unit sections 5 carrying flat conveyer flights or blades 6 are secured. While the flights 6 could be secured directly to the shaft 4, by securing them to unit sections 5 secured to the shaft 4, they may be kept in stock and furnished for any length of drive shaft which of course is an important feature from a manufacturing and sales point of view. Each of the sections 5 are adapted to interlock with the adjoining section by providing tongues 7 on one end and grooves or notches 8 on the other end, the tongues 7 of one section fitting into the grooves 8 in the next section so that when the units are assembled upon the shaft 4 a continuous tubular shaft will be formed surrounding the shaft 4. Each section 5 also carries a set screw 9 to engage the shaft 4 and secure it thereto.

The blades or flights 6 are semi-circular plates having a recess 10 formed in the medial portion of the diametrically extending lower edge 11, and a tongue 12 formed from that part of the plate cut to form the recess extends at right angles to the plate at the upper side 13 of the recess and is provided with a longitudinally extending slot 14. The sides 15 of the recess 10 are inclined outwardly with respect to the side 13.

Each section 5 is provided with a boss 16 and one set of alined recesses 17 and another set of alined recesses 18 are cut in the outer side of the section adjacent said boss. These recesses are inclined at an angle to the vertical axis of the shaft 4 so as to give the proper pitch to the conveyer blades, it being understood that the inclination of these recesses with respect to a vertical axis of the shaft may be varied to suit the conditions of the work for which the conveyer is to be used. A recess 19 is provided in the boss 16 and an aperture 20 extends through the boss and receives a bolt 21 whose head is mounted in the recess 19. This bolt passes through the slot 14 in the tongue 12 of the blade and with its nut 21' secures the blade to its respective section in which case the blade is so positioned as to seat its sides 15 in either of the sets of recess 17 or 18.

For feeding the material in one direction the blade of one section is secured to its member 5 so that the edges 15 will be disposed in the recesses 17 of that member and the blade of the next section is secured to its member 5 so that the edges 15 will be disposed in the recesses 17 of that member which is turned at 180° with respect to the first section, and the first blade is on the upper portion of the shaft while the second blade is on the lower portion of the shaft and thus all the blades coöperate to form a continuous screw conveyer. By loosening the bolts 21 and turning the blades on the bosses so that they will be inclined in the opposite direction, that is, so that the first blade engages the recesses 18 and the next blade the recesses 18 the direction of feed of the conveyer can be reversed without changing the direction of drive of the shaft 4 and it will also be noted that each of the units forming the conveyer are interchangeable.

What I claim as my invention is:

1. In a screw conveyer, the combination with a shaft, of a plurality of tubular sleeves secured thereto, conveyer flights, means readily reversibly securing a flight to each of said sleeves and including a laterally projecting lip on each flight, means for securing said sleeves to the shaft, and interlocking means between the meeting ends of the tubular sleeves, whereby said tubular sleeves form a substantially continuous shaft surrounding the other shaft.

2. In a screw conveyer, a conveyer unit comprising a member provided with two sets of grooves inclined with respect to the vertical axis of said member, a semi-circular conveyer plate having parts adapted to seat in either of said sets of grooves, a tongue member carried by said plate, and means engaging said tongue member and said first mentioned member to secure the plate thereto in adjusted position.

3. In a screw conveyer, a conveyer unit comprising a member provided with two sets of grooves inclined with respect to the vertical axis of said member, a boss formed on the member intermediate the grooves, a semi-circular conveyer blade having parts adapted to seat in either of said sets of grooves and provided with a slotted tongue, and a bolt on said member passing through said tongue to secure said blade to the boss of said shaft member when in adjusted position.

4. In a reversible screw conveyer, the combination, with a shaft, of a plurality of tubular members secured thereto, interlocking connections between the meeting edges of adjacent tubular members, a boss formed on each tubular member, said tubular members being each provided with two sets of grooves disposed one set on each side of said boss and the grooves of each set being inclined with respect to the vertical axis of the tubular member and being inclined in opposite directions, and a semi-circular plate secured to the boss of each tubular member and adapted to have its diametrically extending lower edge disposed in either of the alined grooves of each set.

5. In a reversible screw conveyer, the combination, with a shaft, of a tubular member secured thereto and provided with two sets of spaced apart alined grooves inclined with respect to the vertical axis of the tubular member, a boss formed on the tubular member intermediate the sets of grooves and provided with an inverted T-shaped slot, a conveyer flight, a laterally projecting tongue extending centrally from the inner peripheral edge of the flight and provided with an elongated opening, the portion of the inner periphery of the flight outwardly of the tongue being shaped to fit in the alined grooves, and a locking bolt having its head engaged in the T-slot of the boss and its shank passed through the elongated opening in the tongue to lock the flight in adjusted position.

6. A reversible conveyer flight comprising a tubular member having alined grooves therein, a semi-circular conveyer blade having its inner ends cut out to engage about the tubular member and in the alined grooves to position the blades in adjusted position, and means engaging the blade and tubular member to lock the blade in adjusted position, said means being disposed on the same side of the tubular member with the blade.

In testimony wherof, I affix my signature.

CHARLES H. EMERSON.

Copies of this patent may be obtained for five cents each, by addressing the "Commissioner of Patents, Washington, D. C."